Feb. 14, 1956  C. W. ADAMS  2,734,671
FISH STRINGER
Filed Oct. 11, 1952
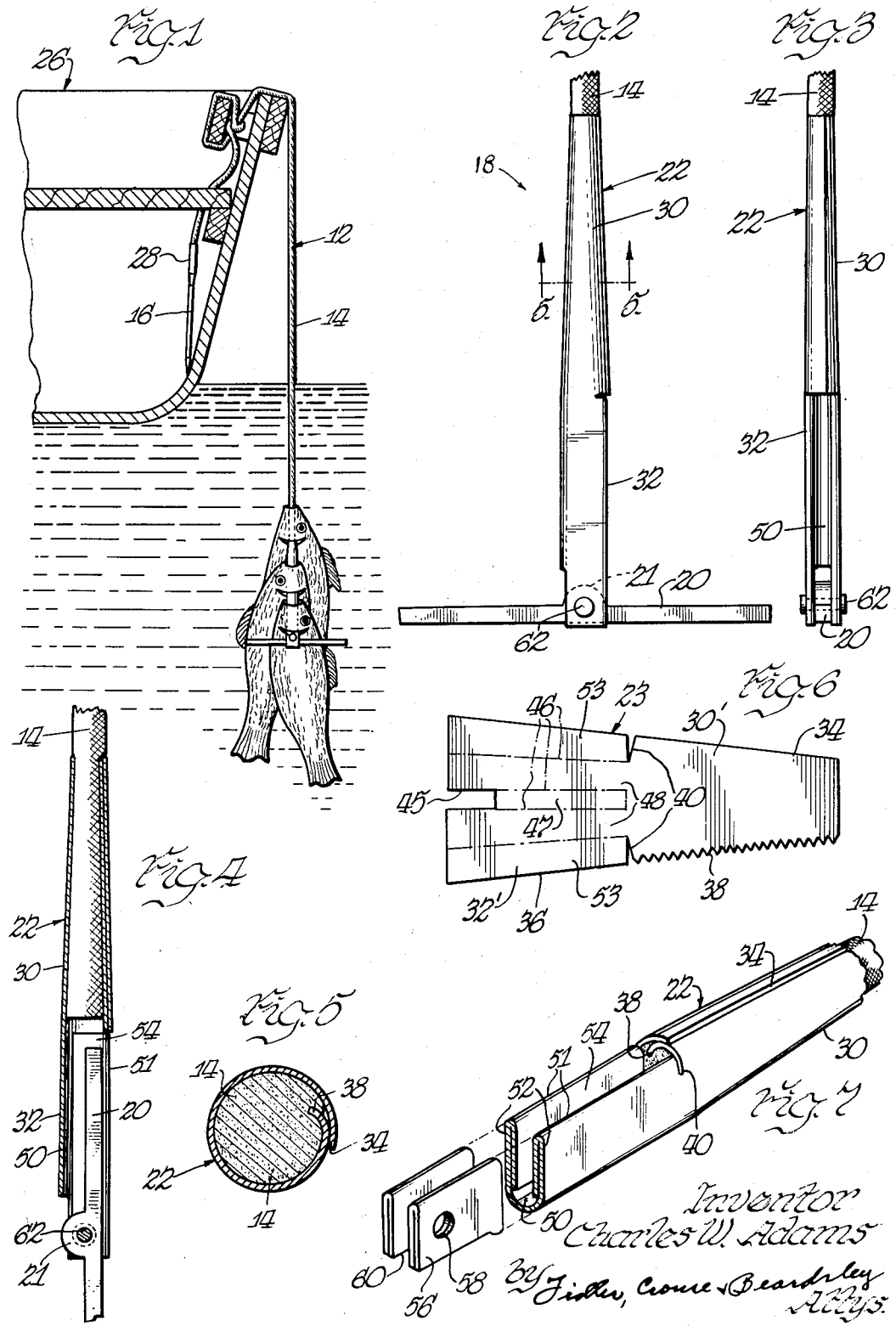
Inventor
Charles W. Adams
By Fisher, Crowe & Beardsley
Attys.

United States Patent Office 2,734,671
Patented Feb. 14, 1956

2,734,671

FISH STRINGER

Charles W. Adams, Chicago, Ill.

Application October 11, 1952, Serial No. 314,374

5 Claims. (Cl. 224—7)

The present invention relates to fish stringers, and particularly to a fish stringer having means on one end, such as a needle, for facilitating stringing the fish on the stringer, and retainer means on the other end for holding the fish on the stringer.

An object of the invention is to provide novel retainer means for a stringer of the foregoing general character.

Another object is to provide a fish stringer having a retainer including a cross-bar and shank of novel construction facilitating conditioning the retainer alternatively for holding fish on the stringer or enabling the fish to be removed from the stringer over the retainer.

A further object is to provide a novel fish stringer having a retainer of simple and economical construction.

A more specific object is to provide a novel fish stringer having a retainer including a cross-bar and shank, in which the shank is made of a single stamping.

Another object is to provide a fish stringer having a novel retainer including a cross-bar and shank, in which the shank is in the form of a stamping, especially adapted for securement to a line of the braided or twisted type, and having serrations engaging the line in gripping engagement.

Still another object is to provide a fish stringer having a retainer including a cross-bar shank, in which the shank is made of a single-piece stamping of novel construction rolled and folded in such a manner as to form a ferrule portion surrounding and gripping the line, and a reinforced channel portion directly supporting the cross-bar and enabling the stop-bar to be moved to a position wherein a portion thereof is disposed in the channel portion and the cross-bar is disposed longitudinally of the line enabling easy removal of fish from the stringer over the cross-bar, and also in which the cross-bar when in longitudinal position is normally so held by frictional engagement with the channel portion.

A still further object is to provide a fish stringer having a novel retainer including a cross-bar and shank, in which the shank is made of a single-piece sheet metal stamping, so constructed that the blank from which it is formed is shaped so as to enable a maximum number of blanks to be obtained from a sheet of metal of given dimensions, with minimum loss through waste material.

Other objects and advantages will appear from the following detail description taken in conjunction with the accompanying drawings, in which—

Figure 1 is a diagrammatic illustration of the use of a fish stringer embodying the present invention;

Fig. 2 is a side view of the retainer and a portion of the line to which it is secured for forming the fish stringer;

Fig. 3 is a view from the right hand side of Fig. 2;

Fig. 4 is a longitudinal sectional view of the retainer including a portion of the line to which the mounting is attached;

Fig. 5 is an enlarged transverse sectional view taken on line 5—5 of Fig. 2;

Fig. 6 is a plan view of the blank from which the mounting from the stop-bar is formed; and Fig. 7 is an enlarged perspective view of the stop-bar mounting and a portion of the cord to which it is secured.

Prior stringers commonly include a ring at the end remote from the needle end through which the needle and line are passed, after threading them through the gill and mouth of the first fish to form an endless loop. In such stringers no two fish can be removed from the stringer at one time. The tendency of the mouth of the fish to close on the line in such an attempt at unstringing them necessitates taking the fish off the line one at a time. This requires so much time with a large string of fish that the general practice is to cram the fish (still on the stringer) in a container, leaving them overflowing the container and partly out of the water in which it is preferred to transport them from the location of fishing. With my stringer, the fish can be instantly allowed to slide off the line, and will lie flat in the container, and generally submerged in water for transporting. Other prior stringers include, in lieu of the ring, a retainer in the form of a cross-bar attached to the end of the line and adapted to extend perpendicularly of the line when the latter is taut but such prior art devices are relatively expensive and require varying degrees of manipulation.

The present invention includes a retainer having a cross-bar movable between a position transversely of the line and a position longitudinally thereof, which is of novel construction such as to be simple in use and of simple and economical construction.

The stringer of the present invention designated generally at 12 is shown in its entirety in Fig. 1. It includes a line 14, which is of suitable strength and firmness, a needle 16 of any suitable form at one end of the line, and the retainer 18 of the present invention at the other end, which includes a cross-bar 20 and a shank 22. The shank is secured to the line and thus may be termed a mounting for the cross-bar. The stringer, when fish are strung thereon as indicated in Fig. 1, may be carried in any suitable manner, or secured to a suitable support such as an element of the boat 26 shown fragmentarily, whereby the fish may be lowered into the water until it is desired to transport the catch from the fishing location. The cross-bar 20 is positioned transversely of the shank 22 when the fish are strung on the stringer for retaining them thereon.

The line 24 may be any of a number of known types of lines, such for example as a braided or twisted cord for facilitating gripping of the shank 22 thereon. The needle 16 may be of any well known type of suitable dimensions, including conventional means for securing it to the string, which may conveniently take the form of an enlarged tubular portion 28 surrounding the end portion of the line or cord and having detents sheared and punched inwardly into gripping engagement with the line.

It is desired that the stringer as a whole be economical to manufacture and capable of being produced at a low price. To this end the retainer 18, constituting the present invention, is made up of two main parts, namely, the cross-bar 20 and the shank or mounting 22. The cross-bar 20 is a simple, uniformly dimensioned element except for a central enlargement 21, and the shank 22 is made up of a single piece, integral metal stamping, both of which lend themselves to economical manufacture, both as to cost of materials and methods of forming them. The shank 22 is well adapted to securement to a line of the character above noted, namely, a twisted, braided or similar cord, avoiding the necessity for employment of more expensive strings in the nature of a chain or other expensive element. The cord being relatively soft and flexible has less tendency to damage the fish.

The shank 22 preferably is formed from a sheet metal blank 23 (Fig. 6) and includes a ferrule or tubular portion 30 and a channel portion 32. The blank includes portions 30' and 32' which are shaped into the ferrule portion 30 and channel portion 32 respectively of the shank. The side edges 34 and 36 of the blank are generally straight and converge in the direction from the outer end of the portion 32' to the opposite end of the portion 30'. The edge 36 adjacent the narrow end of the blank is provided with a plurality of teeth or serrations 38 which in the completed mounting are disposed in the ferrule portion 30 in gripping engagement with the line for aiding in securing the mounting on the string.

Slots 40 extend inwardly a short distance from the lateral edges 34 and 36 of the blank and are disposed adjacent the mid-position longitudinally of the blank between the portions 30' and 32'. The slots 40 facilitate shaping the respective portions into the ferrule element and channel element of the mounting. The portion 32' of the blank is provided with a notch 45 in its end edge for forming a convenient opening in the channel element for pivotally mounting the cross-bar 20.

In shaping the blank and applying it to the line, the portion 30' is rolled around the end portion of the line into tubular form and into tight gripping engagement therewith, with the lateral edge portions 34 and 36 overlapping in circumferential directions and with the edge portion 36 inwardly of the edge portion 34. The serrations or teeth 38 are bent inwardly in a generally radial direction (Fig. 5) so as to penetrate into the line and aid in gripping of the tubular portion with the line. The tapered shape of the portion 30' of the blank provides a generally tapered ferrule portion 30, and due to the gripping action of the ferrule portion on the line the latter is slightly compressed to a dimension slightly less than its normal original dimension so that the end of the ferrule portion is in effect slightly countersunk (Fig. 4) inwardly and the outer surface of the ferrule portion at that end is only slightly greater in diameter than the line. By virtue of this arrangement the fish, when they are strung on the stringer, will slide easily from the line 14 on to the shank or mounting 22 without hindrance from abutment with the end surface of the shank.

The portion 32' of the blank 23 is shaped into a channel form (Figs. 3 and 7) by a suitable folding operation which may take place separately from or in conjunction with the rolling operation of the ferrule portion. The portion 32' is folded along the lines 46 in such a way that the central part 47 constitutes the web 50 of the completed channel, the parts 48 outwardly thereof form flange elements 50 of the flanges 51, and the outermost parts 53 form reinforcing elements 54 on the inner surfaces of the elements 52. The flanges thus are of reinforced construction having double thickness, providing increased strength. The notch 45 in the blank provides for the extension of the flanges 51 longitudinally beyond the web 50, forming projections or extensions 56 of the flanges which are provided with transversely aligned apertures 58. The cross-bar 20 is fitted in the shank 22 by positioning it in the opening 60 provided by the notch 45 and pivotally mounting it in the flange extensions 56 by suitable means such as a pin 62 inserted through the apertures 58 and through the aperture in the enlargement 21 of the cross-bar, and riveted over the outer surfaces of the flange extensions.

The cross-bar 20 is thus pivoted at a point intermediate its ends for swinging movement between a position such as in Fig. 2, wherein it is disposed transversely of the longitudinal direction of the shank and line and a position as shown in Fig. 4 in which it extends longitudinally of the shank and line with one end disposed in the channel portion and disposed entirely within the cross-sectional confines of the channel. Preferably the thickness of the cross-bar and the distance between the inner surfaces of the flanges of the channel are so correlated that the cross-bar is normally retained in longitudinal position by friction engagement, assuring that the cross-bar will not accidentally move to transverse position in the operation of removing the fish from the stringer over the retainer. However, the cross-bar can be easily moved out of longitudinal position by manual pressure applied.

In stringing the fish on the stringer, they are strung in the manner above described and the cross-bar is set to the transverse position of Fig. 2 if it is not already in that position. This can be easily accomplished during the operation of stringing the fish, i. e., when the first fish is slid down the line, the user merely flips the cross-bar to the transverse position as the fish approaches the end of the stringer and then the fish is slid down into engagement with the cross-bar. The cross-bar then remains in that position when any additional fish are strung on the stringer.

To remove the fish from the stringer, it is desired to remove them over the lower end of the stringer. To do so, the fish are slid upwardly slightly and the cross-bar 20 is moved to the position of Fig. 4 and then the fish are permitted to drop, whereupon they slide off the stringer over the cross-bar.

When the cross-bar is in the position of Fig. 4, its upper end portion is entirely within the confines of the channel, and the whole cross-bar, including the enlargement 21, is entirely within the longitudinal projection of the exterior surface of the shank, so that the fish, in sliding over the cross-bar, do not encounter any abutments or shoulder elements and are thus enabled to easily slide off of the stringer.

The mounting 22 is formed from a single-piece, integral sheet metal stamping. Great economy is realized in the manufacture thereof, both in materials used and manufacturing methods employed. The construction whereby the ferrule or tubular portion 30 firmly grips the line or cord is effective for maintaining a permanent securement of the shank on the line, and the teeth 38 particularly because of their radial disposition in the finally shaped article further aid in securing the mounting on the line.

The reinforced flanges 52 of the channel portion 32 provide unusual strength while at the same time simplicity and economy are maintained.

The construction of the device is unusually effective in enabling one portion of an integral stamping element to be rolled into a tubular shape and another portion to be folded into a reinforced channel shape. The ferrule or tubular portion 30 is possessed of a long and gradual taper with the small end not materially greater in diameter than the normal diameter of the line so that the fish slide easily from the line onto the shank and over the ferrule portion thereof onto the channel portion.

The construction moreover produces effective securement of the shank on a line of the woven or braided type, in the provision of the serrations or teeth 38 which engage or bite into the line. Thus, the necessity for utilizing a line of the link or chain type, or other relatively more expensive lines is avoided.

The shape of the stamping 23 (Fig. 6) is that a plurality of them can be laid out on a piece of sheet metal and stamped therefrom so that a maximum number of such stampings can be obtained from a sheet of given dimensions, with minimum loss through waste material.

It is also contemplated that, if it is so desired, and as an alternative arrangement for securing the shank element 22 on the line, the line be provided with a knot or enlargement on its end for engagement with the inner surface of the ferrule 30 and wedging action therein as it is urged relatively toward the reduced end, but of such large dimensions as to be precluded from withdrawal through the small end of the ferrule.

I claim:

1. A fish stringer comprising a line, and a retainer on one end of the line, said retainer including a ferrule surrounding an end portion of the line in gripping engagement therewith, a channel portion extending longitudinally and integrally from the end of said ferrule beyond the end of the line, and a cross-bar pivoted in the extended end of the channel portion at a point on the cross-bar intermediate the ends thereof and movable between a position transversely of the ferrule and channel portion and a position longitudinally thereof in which a portion of the cross-bar is disposed in said channel portion.

2. A fish stringer comprising a line, and a retainer on one end of the line including an integral, elongated element having a ferrule portion surrounding an end portion of the line in gripping engagement therewith, and a channel portion extending longitudinally from the end of the ferrule portion beyond the end of the line, said channel portion having a web and flanges, said flanges being formed by material folded back upon itself and having integral extensions beyond the end of the channel in a direction away from said ferrule and forming spaced parallel arms, and a cross-bar pivoted in said arms intermediate the ends thereof and at a point adjacent the end of the channel whereby said cross-bar may be swung between a position transversely of said elongated element and a position wherein a portion of said cross-bar is disposed in said channel and the remainder extends in longitudinal alignment therewith.

3. A fish stringer comprising a line, and a retainer on one end of the line including an integral, elongated shank element having a ferrule portion surrounding an end portion of the line in gripping engagement therewith, and a channel portion extending longitudinally from the end of the ferrule portion beyond the end of the line, said channel portion having a web and flanges, said flanges having extensions projecting beyond the web, said ferrule portion tapering from said channel portion to the inner end of the ferrule portion with the latter having a smaller transverse dimension than the normal transverse dimension of the line, and a cross-bar pivoted in said extension at a point intermediate the ends of the cross-bar, the latter being movable between a position transversely of the shank element and a position longitudinally of the shank element wherein a portion thereof is entirely within the cross-sectional confines of the channel portion.

4. A fish stringer comprising a line, and a retainer on one end of the line including a shank element formed as an elongated, integral sheet metal stamping having a ferrule portion and a channel portion, said ferrule portion surrounding an end portion of the line in gripping engagement therewith and having circumferentially overlapping portions with the inner lapped portion having serrations along its lateral edge directed generally radially inwardly into engagement with the line, said channel portion extending longitudinally from the end of said ferrule portion beyond the end of the line and having a web and flanges with the flanges including elements reinforced with portions on the free edges of the elements folded on themselves, the flanges extending longitudinally beyond the web forming a transverse passage through the channel portion between the flanges at the extended end of the channel portion, and a cross-bar disposed in said opening and pivoted in the extended end portions of the flanges at a point on the cross-bar intermediate the ends thereof, the cross-bar being movable between a position transversely of the shank element and a position longitudinally thereof wherein one end of the cross-bar is disposed in said channel portion wholly within the cross sectional confines thereof, said cross-bar having a thickness and the channel portion having a dimension between the inner surfaces of its flanges so correlated that the cross-bar is normally retained in longitudinal position by frictional engagement with the flanges.

5. A fish stringer comprising a line, and a retainer on one end of the line, said retainer including an integral, elongated element having a ferrule portion of substantial length in gripping engagement throughout its length with an end portion of the line, a channel portion extending longitudinally from the end of said ferrule portion beyond the end of the line, and a pair of spaced, parallel arms extending in prolongation of the flanges of said channel portion said ferrule and channel portions and said arms having relatively smooth walls throughout their lengths, and a cross-bar having a maximum transverse dimension less than the transverse dimension of said channel and pivoted in said arms at a point on the cross-bar intermediate the ends thereof, whereby the cross-bar is movable into a position wherein a portion of the cross-bar is entirely within in said channel portion and the remainder of the cross-bar extends in longitudinal alignment therewith.

References Cited in the file of this patent

UNITED STATES PATENTS

| | | |
|---|---|---|
| 1,608,953 | Pflueger | Nov. 30, 1926 |
| 1,770,971 | Conner | July 22, 1930 |
| 2,456,554 | Churchill | Dec. 14, 1948 |
| 2,536,531 | Bishop | Jan. 2, 1951 |
| 2,584,124 | Gustafson | Feb. 5, 1952 |